(12) United States Patent  
Fujisawa et al.

(10) Patent No.: US 8,155,637 B2  
(45) Date of Patent: Apr. 10, 2012

(54) METHOD OF DELIVERING INFORMATION TO CELLULAR TERMINAL AND INFORMATION DELIVERY SERVER

(75) Inventors: Tomonori Fujisawa, Tokyo (JP); Shouji Satou, Kuroiso (JP)

(73) Assignee: Kabushiki Kaisha Eighting, Tokyo (JP)

( * ) Notice: Subject to any disclaimer, the term of this patent is extended or adjusted under 35 U.S.C. 154(b) by 1756 days.

(21) Appl. No.: 10/487,143

(22) PCT Filed: Aug. 23, 2002

(86) PCT No.: PCT/JP02/08540  
§ 371 (c)(1),  
(2), (4) Date: Feb. 23, 2004

(87) PCT Pub. No.: WO03/019965  
PCT Pub. Date: Mar. 6, 2003

(65) Prior Publication Data  
US 2004/0203925 A1    Oct. 14, 2004

(30) Foreign Application Priority Data

Aug. 24, 2001    (JP) .................................. 2001-255273

(51) Int. Cl.  
*H04W 4/00*    (2009.01)
(52) U.S. Cl. .............. 455/422.1; 455/456.1; 340/323 R; 273/237
(58) Field of Classification Search .............. 455/412.1, 455/414.1, 414.2, 422.1, 456.1; 463/25, 463/42, 40, 46, 16, 18; 340/323, 286.02, 340/323 R; 273/237  
See application file for complete search history.

(56) References Cited

U.S. PATENT DOCUMENTS

| | | | | |
|---|---|---|---|---|
| 4,019,176 A | * | 4/1977 | Cour et al. ..................... | 709/251 |
| 4,958,837 A | * | 9/1990 | Russell .............................. | 463/9 |
| 5,813,863 A | * | 9/1998 | Sloane et al. .................. | 434/236 |
| 6,320,495 B1 | * | 11/2001 | Sporgis ...................... | 340/323 R |
| 6,416,414 B1 | * | 7/2002 | Stadelmann .................... | 463/42 |
| 6,554,707 B1 | * | 4/2003 | Sinclair et al. .................. | 463/39 |
| 6,565,437 B2 | * | 5/2003 | Orui ................................ | 463/29 |
| 6,587,441 B1 | * | 7/2003 | Urban et al. .................. | 370/310 |
| 6,628,939 B2 | * | 9/2003 | Paulsen ...................... | 455/414.1 |
| 6,652,283 B1 | * | 11/2003 | Van Schaack et al. ........ | 434/236 |

(Continued)

OTHER PUBLICATIONS

Patent Abstracts of Japan; Publication No. 09-172672; Publication Date Jun. 30, 1997; Applicant NEC Corp.

(Continued)

*Primary Examiner* — Charles Appiah  
*Assistant Examiner* — Alexander Yi  
(74) *Attorney, Agent, or Firm* — Manabu Kanesaka

(57) ABSTRACT

The present invention provides local information indispensable for travelers or the like and serves as a guide satisfying the travelers' tastes at places where the travelers are staying on their journeys. Positional information is detected from an information request signal transmitted from a cellular terminal, and when the cellular terminal is within a specific area, information corresponding to the specific area is delivered to the cellular terminal in a form of a quiz or a game. Further to a response from the cellular terminal for the information delivered to the cellular terminal, a result record is delivered, and when the cellular terminal is not within the specific area, information other than that corresponding to the specific area is delivered. When giving a point according to the result, a point for the information corresponding to the specific area is set at a higher value as compared to that for the information other than that corresponding to the specific area.

8 Claims, 9 Drawing Sheets

U.S. PATENT DOCUMENTS 6,827,644 B2 * 12/2004 Kondo .............................. 463/7
6,931,290 B2 * 8/2005 Forest ............................ 700/90

OTHER PUBLICATIONS

Patent Abstracts of Japan; Publication No. 2000-082199; Publication Date Mar. 21, 2000; Applicant Futaba Keiki KK.
Patent Abstracts of Japan; Publication No. 2000-215231; Publication Date Aug. 4, 2000; Applicant Fujitsu Ten Ltd.
Patent Abstacts of Japan; Publication No. 2001-084302; Publication Date Mar. 30, 2001; Applicant Kazuya Sato.
Patent Abstracts of Japan; Publication No. 08-190574; Publication Date Jul. 23, 1996; Applicant Ekushingu et al.
Patent Abstracts of Japan; Publication No. 09-305518 Publication Date Nov. 28, 1997; Applicant Hitachi Ltd.
Patent Abstracts of Japan; Publication No. 2001-153664; Publication Date Jun. 8, 2001; Applicant Alpine Electronics Inc.
Patent Abstracts of Japan; Publication No. 08-063179; Publication Date Mar. 8, 1996; Applicant Taito Corp.
Patent Abstracts of Japan; Publication No. 09-073467; Publication Date Mar. 18, 1997; Applicant Taito Corp.

* cited by examiner

Fig. 4

| No | Question | Keyword | Point | Priority | Category | Participation style | App. time |
|---|---|---|---|---|---|---|---|
| 00000001 | △○×△○×△○×△○× | ○×△ | 5 | 1 | AAAAAAAAAA | Female group | 0:00~24:00 |
| 00000002 | △○×△○×△○×○×△ | ○××△○ | 2 | 1 | BBBBBBBBBB | Female group | 11:00~14:00 |
| 00000003 | △○×△○×△○×△○× | ×△○× | 3 | 2 | AAAAAAAAAA | Family | 0:00~24:00 |
| 00000004 | △○×△○×△○×△○× | ×△○ | 1 | 1 | CCCCCCCCCC | Male group | 6:00~16:00 |
|  |  | ×△ | 3 | 3 | DDDDDDDDDD | Female group | 17:00 |
|  |  |  |  |  | AAAAAAAAAA | — |  |
|  |  |  |  |  |  |  |  |
|  |  | ××△○ |  |  | AAAAAAAAAA | Mixed group | 0:00~24:00 |
|  |  | ○×△○ | 1 |  | DDDDDDDDDD | Female group | 0:00~24:00 |
| NNNNNNNN | △○×△○×△○×△○× | ×××× | N | NNNNNNNN | DDDDDDDDDD | ????? | 17:00~22:00 |

Fig. 7

| No | Question | Answer | Point | Position setting | Point |
|---|---|---|---|---|---|
| 00000001 | △○×△○×△○× | △○× | 2 | [lat] 12' 04"02 06 ~ 12' 04"20 06<br>[lon] 36' 21"02 06 ~ 36' 21"20 06 | 23 |
| 00000002 | △○×△○×△○× | ○×△ | 5 | [lat] 12' 04"02 06 ~ 12' 04"20 07<br>[lon] 36' 21"02 06 ~ 36' 21"20 08 | 2 |
| 00000003 | △○×△○×△○× | ×△○ | 4 | [lat] 12' 04"02 10 ~ 12' 04"20 11<br>[lon] 36' 21"02 07 ~ 36' 21"20 08 | 1 |
| 00000003 | △○× | ×△○ | 1 | [lat] 12' 04"02 36 ~ 12' 04"20 52<br>[lon] 36' 21"02 22 ~ 36' 21"20 21 | |
| | | | | [lat] 12' 04"02 33 ~ 12'<br>[lon] 36' 21" | 1 |
| | △○×△○×△○× | ???? | NNN | ~ 12' 04"20 42<br>~ 36' 21"20 23 | 200 |
| NNNNNNNN | △○×△○×△○× | 2222 | | [lat] nn' nn"nn nn ~ nn' nn"nn nn<br>[lon] nn' nn"nn nn ~ nn' nn"nn nn | NNN |

METHOD OF DELIVERING INFORMATION TO CELLULAR TERMINAL AND INFORMATION DELIVERY SERVER

TECHNICAL FIELD

The present invention relates to a method of delivering to a cellular terminal in a specific area various types of information corresponding to the specific area and a server for delivering the information.

BACKGROUND TECHNOLOGY

In the conventional technology, the information inputted from a cellular terminal such as a cellular telephone has no connection to a position of the terminal receiving the information, but in association with the recent improvements in functions of cellular terminals, for instance, in a system for automatically reporting a position of a taxi like that as disclosed in Japanese Patent Laid-Open Publication No. 2000-82199 "Vehicle Allocation System", a value of input information integrated with positional information has been appreciated. In the technologies as described above, the value of positional information itself indicating a location has been appreciated, and the technologies do not contribute to making the value of input information itself higher by simultaneously making use of the input information from a cellular terminal and the positional information in the combined form.

The local information delivery system for delivering information for a current position disclosed in Japanese Patent Laid-Open Publication No. HEI 9-172672 "Simplified Cellular Telephone System" may be regarded as a prototype of the present "town navigation" system , but this system provides only the related information linked to the positional information.

Further, Japanese Patent Laid-Open Publication No. 2000-215231 "Travel Planning Assisting Apparatus, Travel Information Delivering Apparatus, and Terminal Device for Delivering Travel Information" is related to an invention for delivering travel information, and this is a convenient travel planning assisting apparatus which displays, when a user inputs a destination and a travel schedule, the local information or travel information relating to the destination, or displays a plurality of types of local information or travel information centering on event information corresponding to the inputted travel schedule. However, this invention is only the supplementary system for the works which have been performed by travel agencies, and this system does not provide any specific pleasure to travelers.

DISCLOSURE OF THE INVENTION

The present invention provides a method of delivering information to a cellular terminal for providing local information indispensable for a traveler together with pleasures, guiding the traveler in accordance with the traveler's schedule and interests as well as for giving not only good memories but also advices after the travel so that the traveler will visit the site again in the future.

The method of delivering information to a cellular terminal according to the present invention is characterized in that positional information is detected from an information request signal transmitted from a cellular terminal, and also in that, when it is determined that the cellular terminal is within a specific area, information corresponding to the specific area is delivered to the cellular terminal in the form of a quiz or a game. To smoothly give an answer to the quiz or carry out the game, it is preferable to deliver information relating to the information corresponding to the specific area.

Preferably a result record is delivered in response to an answer to the information delivered to the cellular terminal from the cellular terminal. When the cellular terminal is not within the specific area, preferably information other than information corresponding to the specific area is delivered. Further information for guiding the nearest specific area may be delivered. When assigning a point to the result, preferably a point for the information corresponding to a specific area is set at a higher value as compared to a point for the information other than that corresponding to the specific area.

An information delivery server according to the present invention is connected through a network to a server capable of acquiring positional information for a cellular terminal and managing the cellular terminal, and delivers information to the cellular terminal in the form of a quiz or a game, and the information delivery server comprises a database for local information to nation-wide areas, a database for local information to a specific area, a database for quiz or game, and a database for positional information. Preferably the information delivery server further comprises a database for point information.

The term of "specific area" as used herein indicates an area specified by an information supplier having the information delivery server such as an administrative zone, an area, a tourist site, a skiing ground, a golf course, an amusement park, a building, and an electric wave receivable area.

Namely, prepared in the information delivery server according to the present invention are information delivered regardless of a site for answering in the form of a quiz or a game, and information delivered to a specified point in the form of a quiz or a game. Which of the two types of information described above is to be used is decided by a user, but the information in the form of a quiz or a game to which a user can give an answer is delivered by automatically determining a location of the user. Preferably a high point should be assigned to a correct answer to a quiz within a specific area.

By analyzing a result of an answer to the quiz and delivering or displaying a message assessing the answer, it is possible not only to promote access to the information registered in the information delivery server, which is a main purpose, but also to develop the transitional or impetuous action such as a travel into the repeated or intended action.

BRIEF DESCRIPTION OF THE DRAWINGS

FIG. 4 is a table used when selecting questions to be delivered to a user;

FIG. 7 is a reference table used in assessing an answer;

BEST MODE FOR CARRYING OUT THE INVENTION

Presently preferred embodiments of the present invention are described in detail below with reference to the related drawings.

Figure 1:
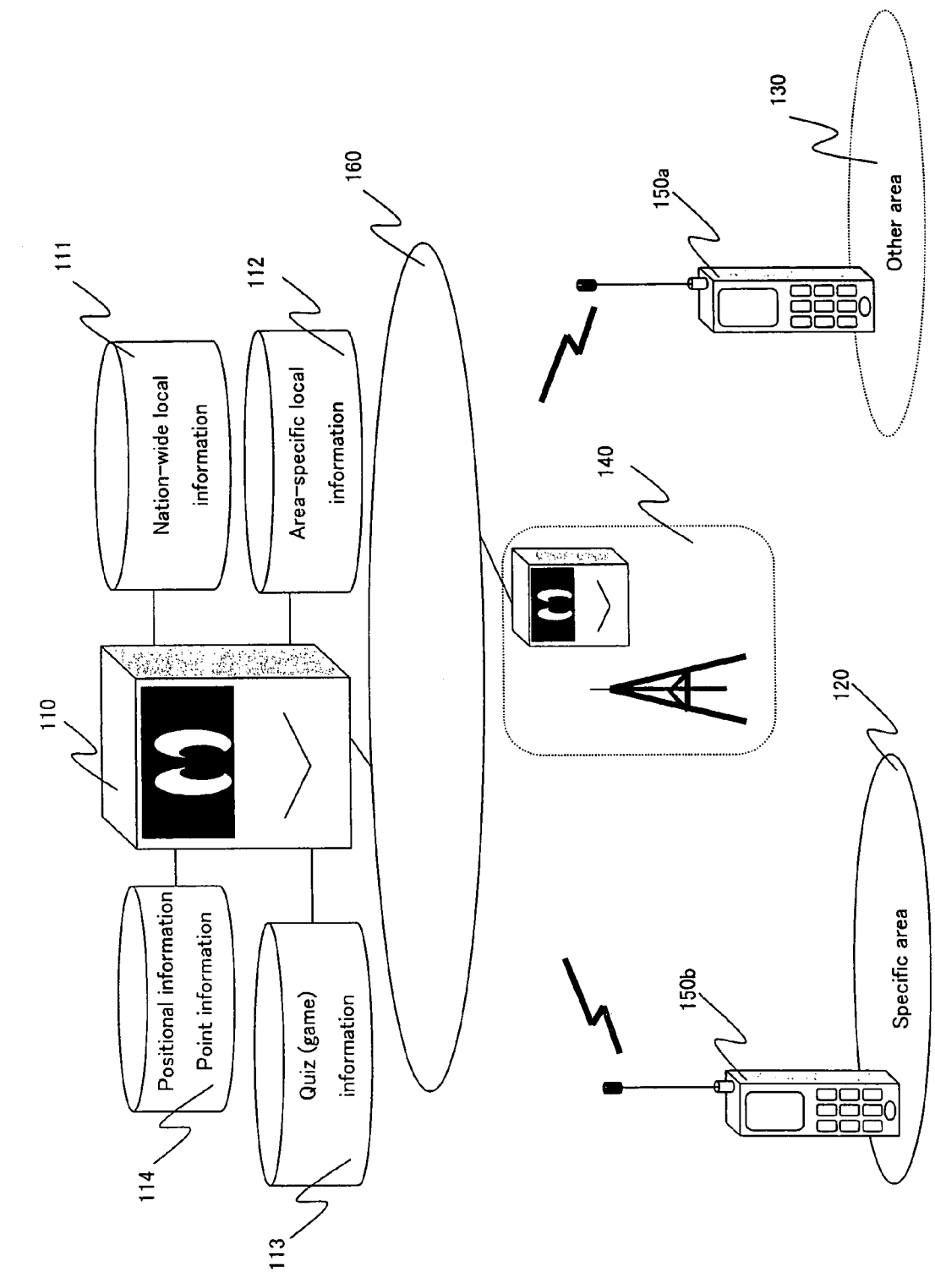
FIG. 1 is a general explanatory view showing outline of an information delivery method according to the present invention.

FIG. 1 is a general explanatory view showing an outline of a method of delivering nation-wide local information and local information for a specific area to a cellular terminal in the form of a quiz or a game.

In FIG. 1, an information delivery server (110) owned by an information provider and a server (140) for cellular terminals are connected to each other via a network (160) such as the Internet, and the information delivery server (110) comprises a data base for nation-wide local information (111) transmitted nationally, local information (112) for a specific area transmitted to the specific area, quiz (or game) information (113), and position/point information (114). Shown in a lower section of FIG. 1 are a specific area (120) such as a tourist spot which is a destination for a travel, a cellular terminal (150b) carried by a user within the specific area (120), an area (130) other than the specific area (120), and a cellular terminal (150a) carried by a user within the area (130), and these cellular terminals (150a, 150b) are connected to the server (140) for cellular terminals. The server (140) has the functions for managing the cellular terminals and also for acquiring data concerning the locations of the cellular terminals. In a cellular information terminal such as a cellular telephone based on the conventional technology, because of the mobility specific to a cellular terminal, it is difficult to identify the location, but in association with the recent advances in the field of positional information technology, it is relatively easy to identify the location, and the precision like that in the car navigation system can be expected in the future.

A user of the terminal (150a) can acquire a point (or a ranking) by answering a question based on quiz information (113) delivered from the information delivery server (110). The question can easily be answered by referring to the nation-wide local information (111), so that access to the local information (111) is promoted.

On the other hand, the contents prepared in the terminal (150b) within the specific area (120) are selected from the local information (112) for the specific area, or those capable of being used for setting a question based thereon to a user within the specific area (120). Further the question should specifically be prepared so that the questioning information is useful as a guidance for the area, and the point given to a user who gives a correct answer to the question is set at a higher value as compared to those acquired in the other area (130) for promoting utilization of this system within the specific area (120).

Figure 2:
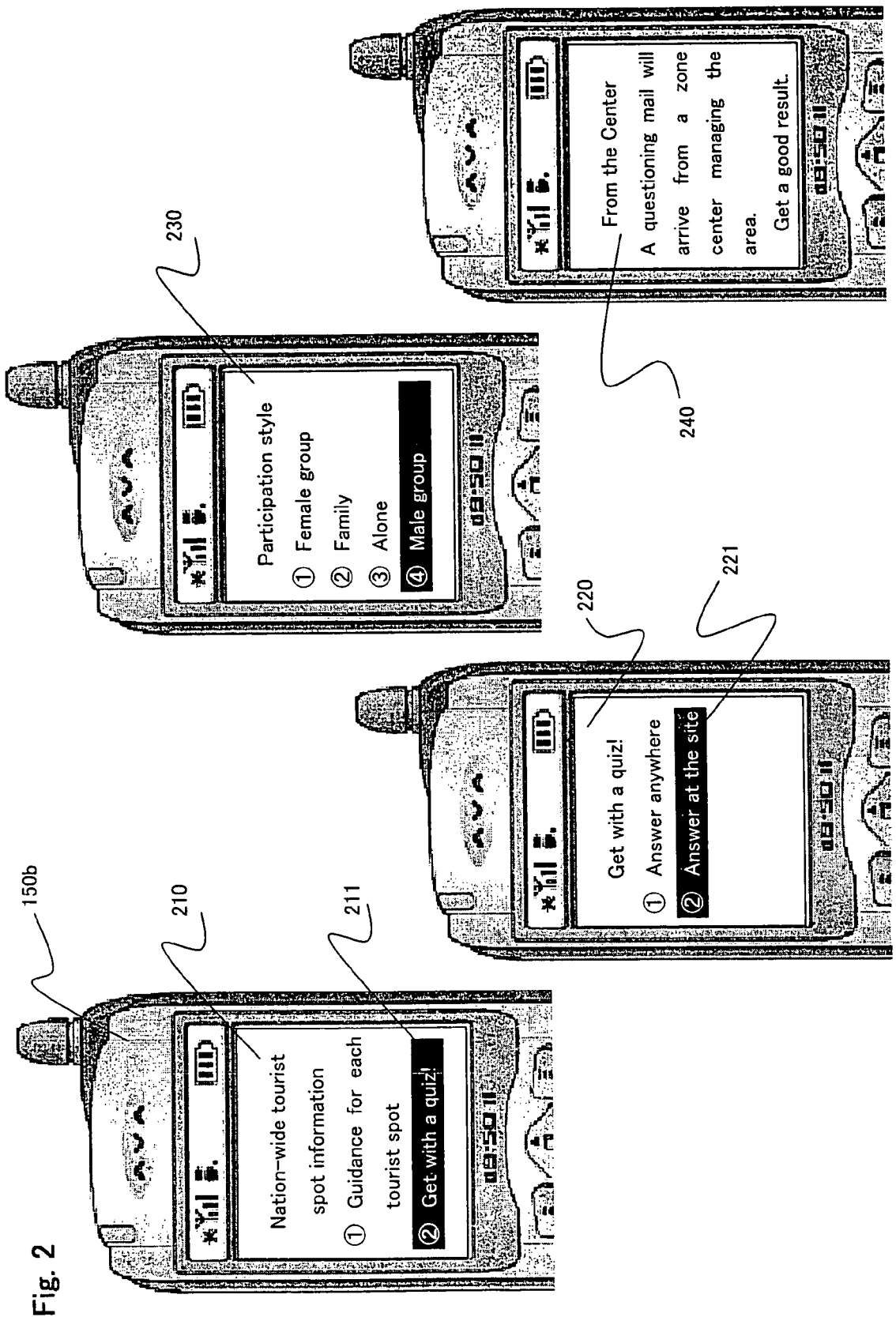
FIG. 2 is an image showing the operational sequence when acquiring local information with a cellular terminal.
Figure 3:
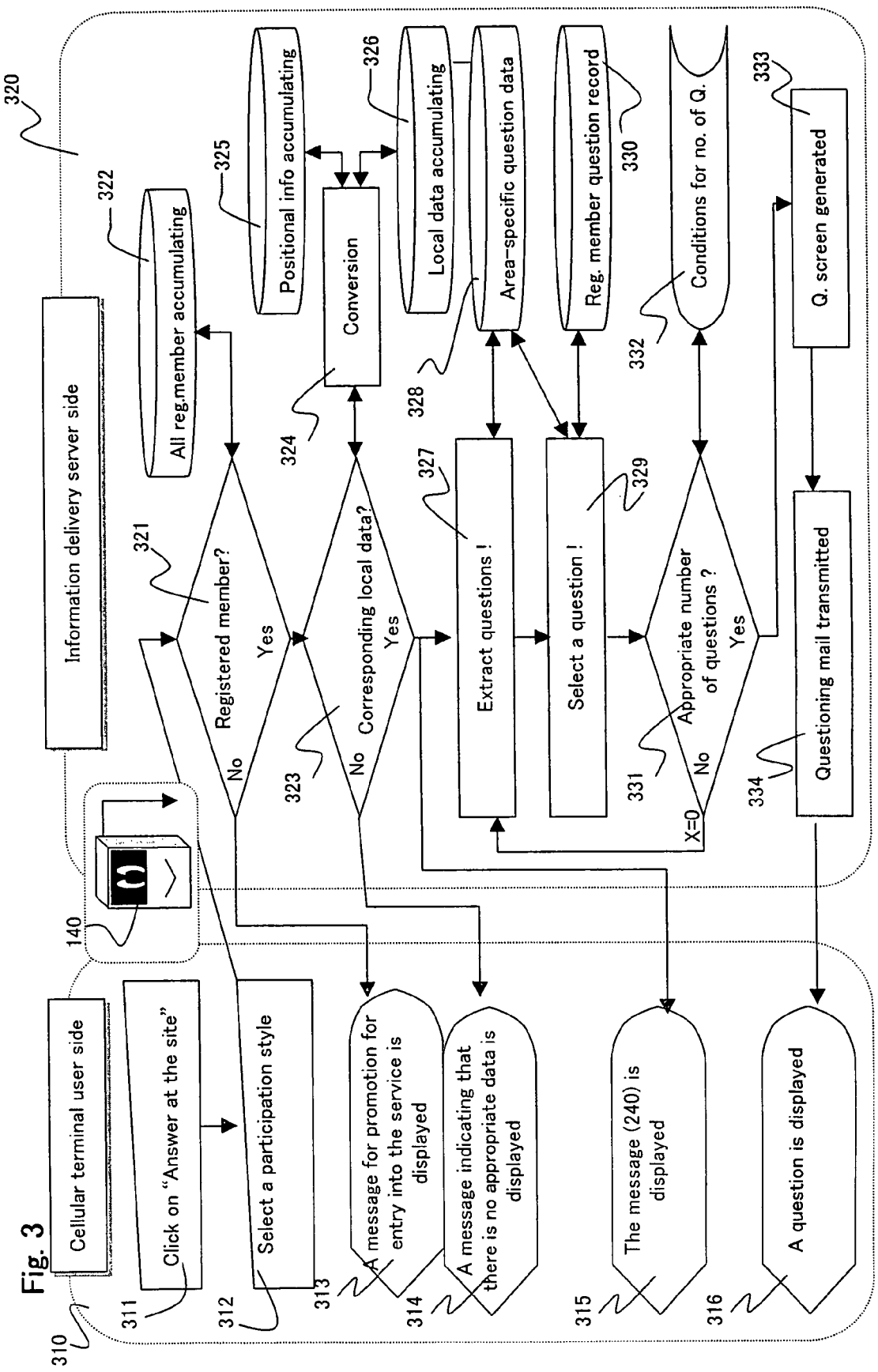
FIG. 3 is a flow diagram showing the processing sequence in an information delivery server.

FIG. 2 schematically shows an operating sequence when a user having moved into the specific area (120) tries to acquire local information with the cellular terminal (150b), and this figure shows in the shift order from the left to right a screen (210), a screen (220), a screen (230), and a screen (240). Reverted sections (211, 221) indicate items selected during the shifting operation. FIG. 3 is a flow chart showing the processing sequence in the information delivery server (110). Operations by a user (310) and screen displays on the cellular terminal corresponding to the user's operations are shown in the left side of the figure.

After the user arrives at the site, the user enters a password previously specified from the cellular terminal (150b) according to the necessity, sequentially switches the default menu screen (210) showing the "Nation-wide tourist spot information" to the "Get with a quiz" screen (220), and then "Answer at the site!" screen (230), and then selects and inputs "Participation style" for the day. With response to the sequential operations, information indicating "Who, when, where, and in which participation style the user entered the "Answer at the site!" program" is sequentially transmitted to the information delivery server (110). Namely, in FIG. 3, when the user (310) clicks on "Answer at the site" (311) and then selects and clicks on any participation style (312), the information is transmitted to the information delivery server (110). In this step, the positional information for the cellular terminal is attached by the server (140) during passage of the information through the server for cellular terminals (140). After the operations described above, when the user selects and clicks on, for instance, the "Next question", the sequential operations can be repeated.

The information delivery server (110) queries (321) the received signal to the all registered member accumulating section (322) to determine whether the signal is from a registered member or not, and when it is determined that the signal is not from a registered member, the information delivery server (110) sends (313) a message for asking the user (310) to participate in the information delivery service to a screen of the terminal carried by the user. On the other hand, when it is determined that the signal is from a registered member, the information delivery server (110) identifies the transmission area from the positional information data included (323) in the signal, and also checks whether the area has been registered in the system or not. In this checking step, the information delivery server (110) makes a query to a positional information accumulating section (325) in which the positional information and area information have been stored as a database, converts (324) the positional information to the area information, and further makes a query to the area data accumulating section (326) to determine whether the area information is for a registered area or not.

When it is determined that there is no registered area data, a message indicating that the current area is not a registered one is returned to the user (310), and displayed (314) on a screen of the user's terminal. On the other hand, when it is determined (323) that there is registered area data, the "From center" screen (240) is displayed (315) to notice start of questioning.

The user (310) having noticed the screen (240) knows that there is the data for "Answer at the site", and waits for arrival of a question mail to the user's cellular terminal.

The information delivery server (110) displays (315) the screen (240) for noticing questioning, and then extracts (327) a question to be given to the user. In this processing for extraction (327), the information delivery server (110) makes a query to an area-specific question data accumulating section (328) in which questions are registered so that the questions are given to users only in the specified area, and selects (329) a question to be given to the user after it is determined that there are registered questions. In this processing (329) for selecting a question to be given to a user, the information delivery server (110) selects a question from the area-specific question data accumulating section (328) according to a pre-specified rule described hereinafter, makes a query to a registered member questioning record accumulating section (330) in which the questions given to the user in the past are registered to determine whether the selected area-specific question was given to the user in the past or not, so that only a question not having been given to the user is selected. This configuration is employed because this information service must be useful as a guidance for the area and the same guidance information should not be given repeatedly, and also to prevent one question from being given repeatedly during one operation (or within a day).

The information delivery server (110) then determines (331), by referring to a condition (332) for the number of questions to be given to the user, whether the number of selected questions are within a range preset for the selected question or not.

In this step, when it is determined that the number of selected questions is not appropriate (=0), an instruction for changing the conditions for "preset rule" is issued, and the system control returns to the processing (327) for extracting the question(s) to be given to the user. When the number of selected question is reduced to that within an appropriate range, the system control shifts to a step of processing (333) for generating a questioning screen, and a screen display is given so that a request for display can be accepted anytime from a cellular terminal, and the screen display is stored until an answer is returned from the user. Also a mail for notifying the first question (questioning mail) is generated in this step and transmitted (334) to the cellular terminal, and the questioning mail is displayed (316) on the user's cellular terminal.

As for the preset rule described above, various conditions may be set, and the condition setting is executed, for instance, by referring to a table (40) shown in FIG. 4. In this table (40), a participation style (47) inputted from the user is regarded as a first condition for selection, and when a plurality of conditions are selected in the same category, those with higher priorities among the priority orders (45) may be selected (for instance, five questions for five specified categories). When it is determined (331) that the number of selected questions is not appropriate (=0) and reselection is executed, the priority orders (45) may be reduced by one respectively. Further, when the priorities (45) are exhausted, the time for questioning is queried to the system time, and a question allowable within the system time may be selected.

Figure 5:
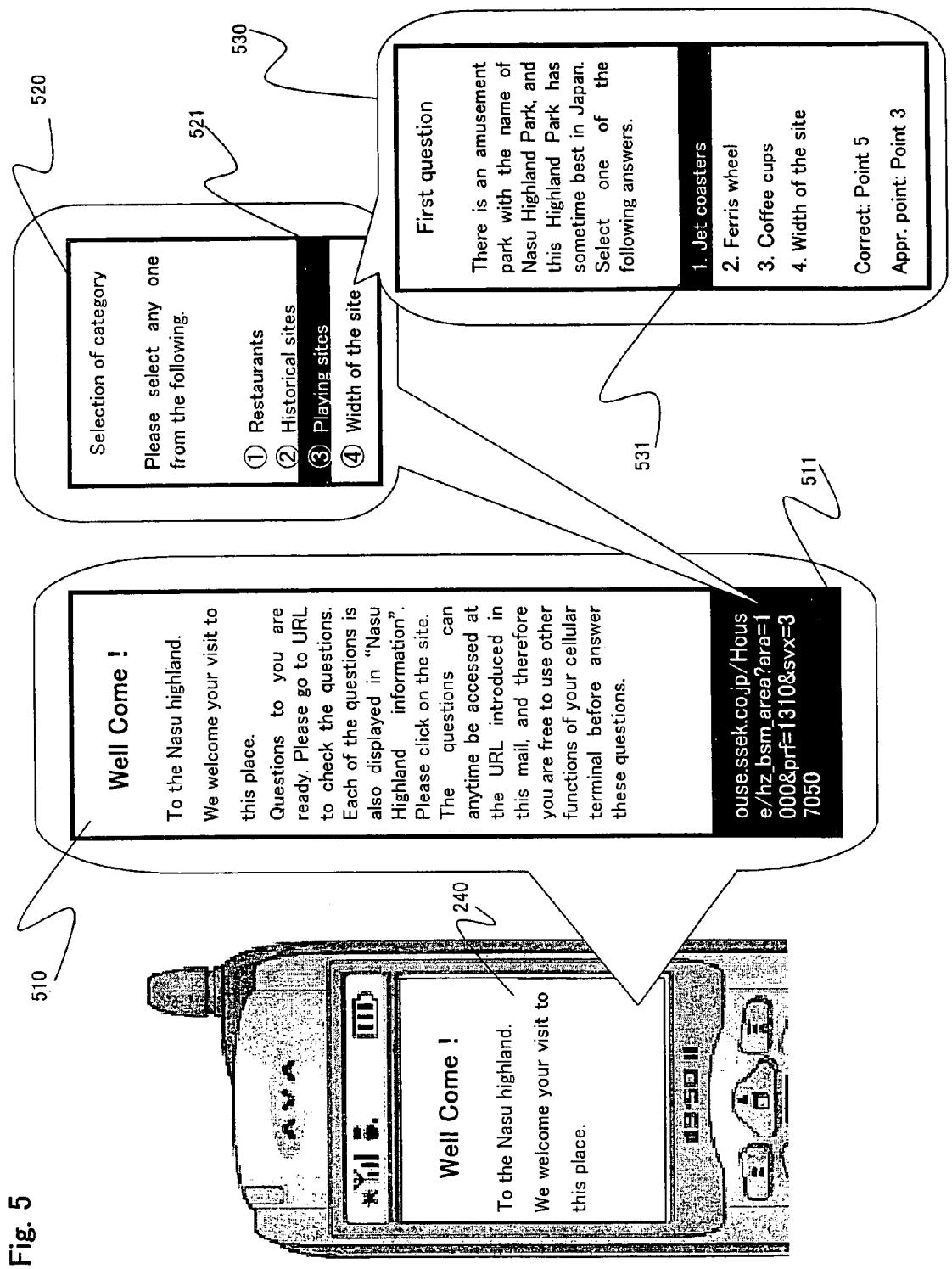
FIG. 5 is an image showing the operating section until selection of a question from a question mail delivered to the user.

The sequence of operations from delivery of a questioning mail until selection of a question is described below with reference to FIG. 5.

When a user receives a questioning mail, the questioning mail is displayed on the user's cellular terminal. The mail (510) includes a URL (511) for the first question page together with an explanatory text, which is linked to the question page. Various categories are listed in this default page (520) of this URL, and the user answers the question by selecting (521) one among the categories so that a question (530) is displayed, and also by selecting (531) one among a plurality of choices. In this embodiment of the present invention, a question is not directly displayed in a mail so that the user can answer the question anytime for the user's convenience. Namely, with this configuration, the user can acquire information relating to the question or can talk with anyone by using a cellular terminal which the user carries before answering the question given in the mail, and then the user can return to the default page (520) or the question (530) easily. Therefore, if there is no need for considering the user's convenience, the questioning screen may have the HTLM form.

Figure 6:
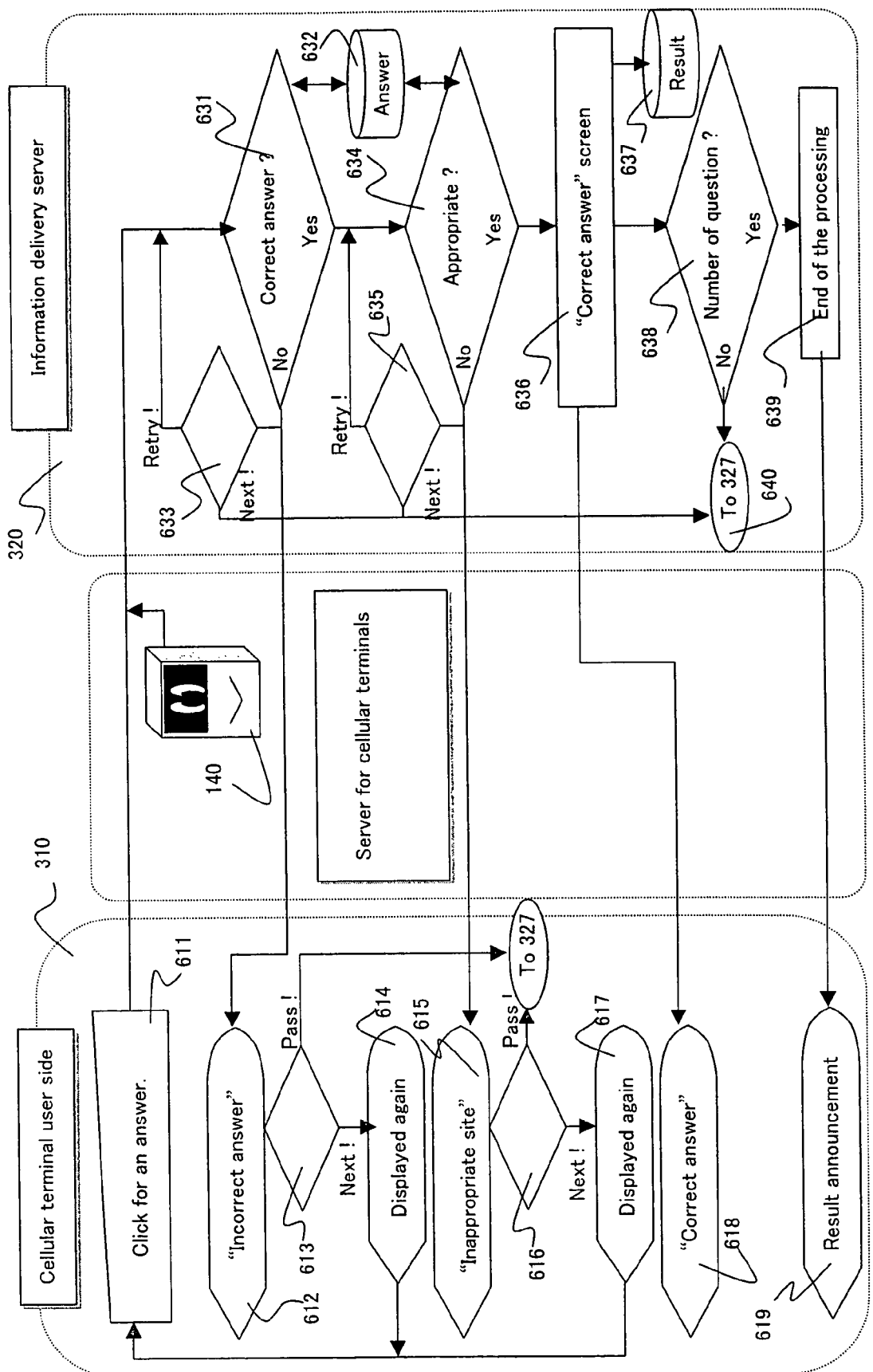
FIG. 6 is a flow diagram showing the processing sequence for assessing an answer in the information delivery server.

A method of assessing an answer and a method of counting a point are described below with reference to FIG. 6. When the user (310) clicks (611) on an answer, namely when a choice is inputted (531) in FIG. 5, a signal including the answer is transmitted via the server for cellular terminals (140) to the information delivery server (110). In this step, positional information data is added to the signal like in the case of the information request signal described above. In the information delivery server (110), the answer data in the received signal is assessed (631). The server (110) queries the answer to the answer accumulating section (632) in which correct answers (72) are accumulated. When it is determined that the answer is not correct, a message indicating that the answer is not correct is transmitted and displayed (612) on the user's cellular terminal. Prepared in the answer accumulating section (632) is a query table 70 as shown, for instance, in FIG. 7, and this table 70 comprises a question column (71), a correct answer column (72), a correct answer point column (73), a position setting column (74), and a position-specific point column (75).

When the message indicating that the answer is not correct is sent to the user, whether the user passes this question or challenges the question again (613, 633) is asked to the user. When the user chooses to pass the question, an operation for extracting a next question (327) is executed. When the user chooses to challenge the question again, the same questioning screen as that displayed previously is displayed again (614), and a response from the user is waited. This loop is repeated until the user gives a correct answer to the question or chooses to pass the question. When the user's response for passing the question is queried, contents with a correct answer and/or public-relational information or other related information included therein may be delivered to the user.

When it is determined that the user's answer is correct in the assessing step (631) described above, the positional data in the signal data is queried to the answer accumulating section (632), and a position of the user is determined (634). Namely, not only questions, but also positional information associated with each question are accumulated in this answer accumulating section (632). When it is determined as a result of query that the answering position is not appropriate, a message indicating the fact is displayed (615). Also in this step, whether the user passes the question or challenges the question again is asked (616, 635) to the user. When the user chooses to pass the question, an operation for extracting (327) the next question is executed. When the user chooses to challenge the question again, the same questioning screen as that displayed before is again displayed (617=614), and a response from the user is waited. This loop is repeated until the user answers the question at an appropriate position or chooses to pass the question.

In the determining step (634), when it is determined that the answering position is correct, a point for the answer is counted, and a result of counting is transmitted (636) to and displayed (618) on the user's cellular terminal. A result of assessment is displayed, for instance, as shown in the lower section of the questioning screen (530) shown in FIG. 5. This point is summed and accumulated as the user's result record in a result record accumulating section (637).

Then the information delivery server (110) determines (618) whether a preset number of questions set in association with a previous response from the user has been reached or not, and when it is determined that a preset value has not been reached, or that the time for termination previously set by the user has not come, an operation for selecting (327) the next question is executed. On the other hand, when it is determined that the preset value has been reached, a notice indicating the termination and a message for announcing the result are sent to the user and displayed (619) on the cellular terminal, then the processing is finished (639). In this embodiment, even when a user gives an incorrect answer, the user's point is not reduced (namely a minus point is not given to the user), and the user is allowed to choose for challenging the question again or passing the question, because this service for giving questions in the form of a quiz is provided not for users to acquire a high assessment, but to contribute to collection of information by users or to serve as a guidance for users in each area so that the users can collect useful information while enjoying the advices or the like for inviting the users to visit the area again.

Figure 8:
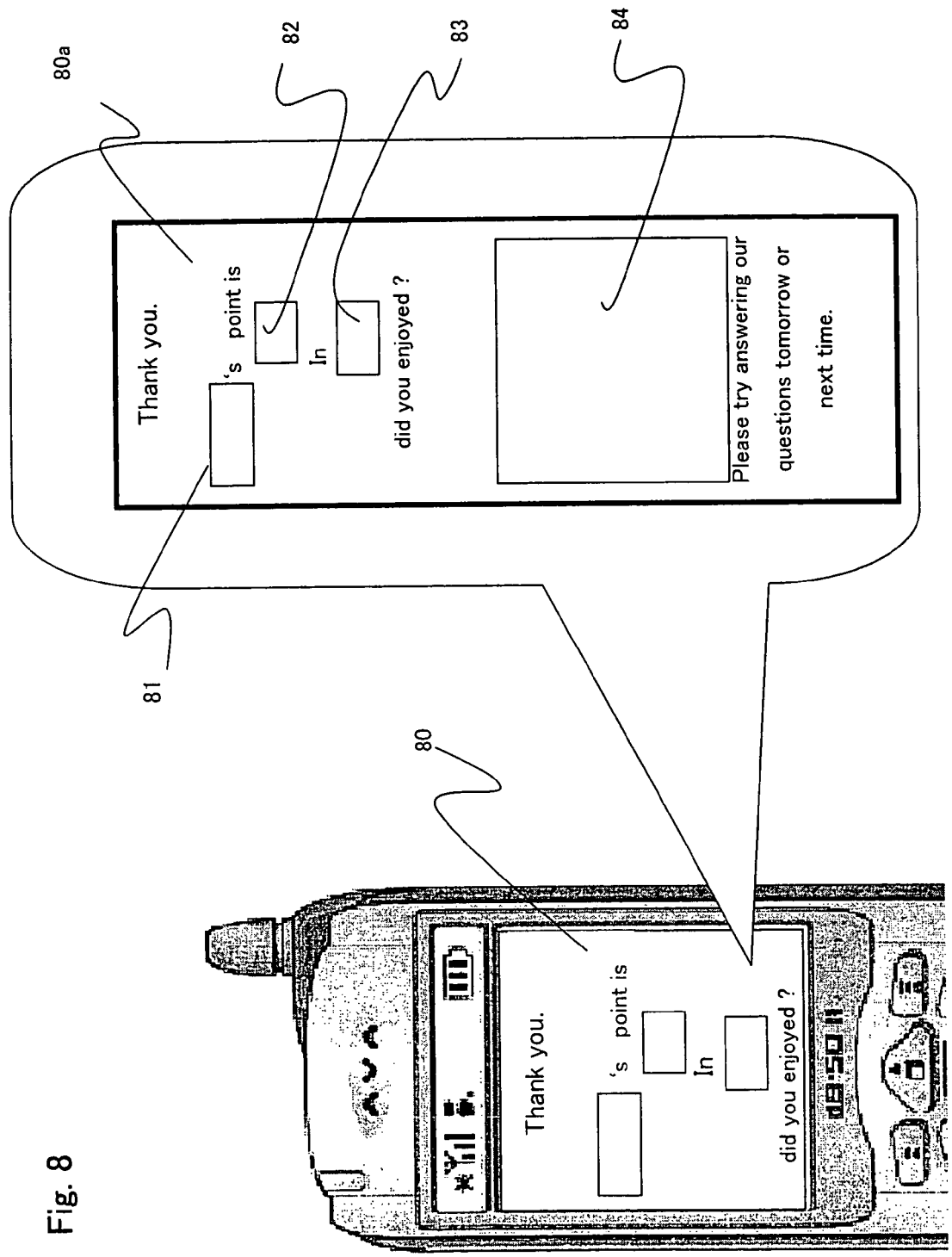
FIG. 8 is an example of a display of an advice message including a result of assessment.

The message for announcing the result is preferably an advice message for promoting revisit to the site by users as shown in FIG. 8. In an example of a message (80) shown in FIG. 8, a message (80a) having a prespecified format with deformable character data such as a user's name (81), a point associated with a quiz (82), input information for a participation style or the like (83), an advice (84) or the like embedded therein is generated.

Figure 9:
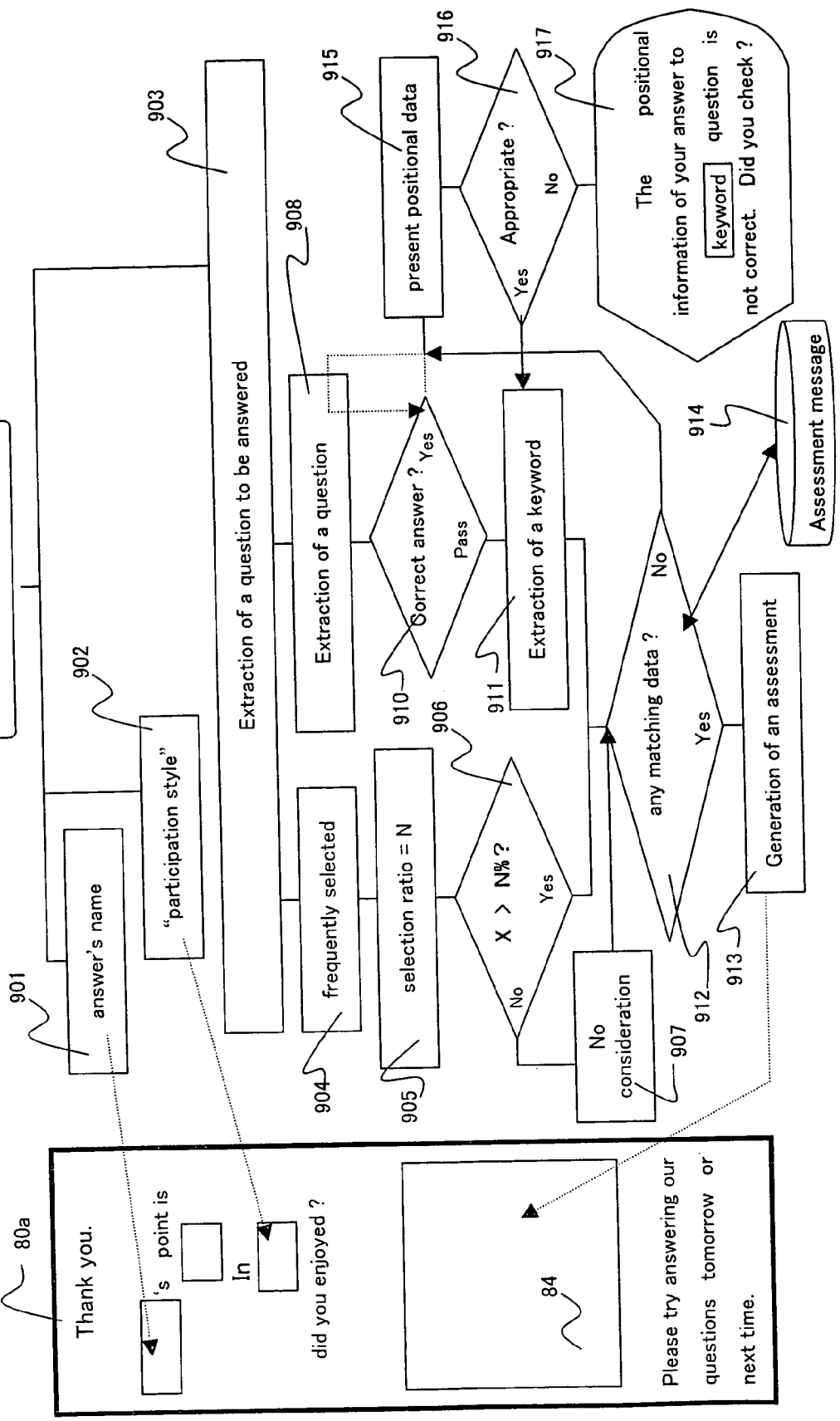
FIG. 9 is a flow diagram showing an operating sequence for generating an advice message in the information delivery server.

A method of generating the advice message is described with reference to FIG. 9.

The user's name (81) can be acquired when the user's password is inputted, and is temporally stored, converted (901) to the responding user's name by referring to the user's ID managed in association with the user's answer in the past, and inserted in the message. Information (902) obtained when the user sets the user's participation style (230) is inserted into the input information indicating the user's participation style (83) or the like.

Then from the questions obtained in response to a quiz and the answering result (903), a category selected most frequently is detected (904), and the category is used for calculating a percentage against the present number of questions (905). Then whether the percentage (N) is larger or smaller than a preset value (X) is determined (906). The preset value (X) may be any value, and for instance, the preset value (X) is set to 30% indicating that three or more answers are correct among 10 questions in all. This determination indicates the user's taste for the category, and when the user's result is below the preset value (X), a determination message may be selected not taking into considerations of the specific category.

In this determining step (906), a category in which the user's result is over the present value (X) is selected; questions with higher priorities (45) are detected (908) from a result of answers (903); determination is made as to whether the answers are correct or not (910); and keywords (43) for the questions are obtained only when the answers are not correct (911). Based on the information and by using the guessing technique, a determination message with high probability is selected (913) from a determination message accumulating section (914), and the determination message is inserted into a message with the preset format as an advice (84).

When there is no appropriate message, a result of determination concerning the preset positional information is detected (915). When a result of determination indicates that the answering position is not appropriate, a screen 917 is displayed. When the result indicates that the answering position is appropriate, a keyword (43) for the question is acquired (911), and an answer determined as correct in an answering result correctness determining section (910) is requested with the priority lowered in the detection processing (908) to acquire the appropriate answer.

The advice message described above has the bidirectional characteristics, and has the effect for inviting tourists to a tourist spot which can not be acquired with the one-directional mass communication media based on the conventional technology.

The information delivery method based on the quiz form was described above, but also the information delivery method based on the game form can be embodied with the substantially same configuration. For instance, a game in which a game character realized by animation gives questions in a quiz form in succession to a user, or a game in which the game character gives directions on the route and a point is given to the user when the user arrives at a prespecified site may be employed in this method.

In the present invention, optimal information can be delivered to a cellular terminal within a specific area, and various types of information are provided in a form of a quiz or a game, so that access to the information can be promoted. Further a plurality of useful effects can be provided such as invitation to a specific area such as a tourist spot, guidance for the current site, and addition of advices for promoting revisit to the specific area.

The invention claimed is:

1. An information delivery method comprising:
    detecting from an information request signal transmitted from a cellular terminal, positional information included in the signal,
    delivering from a server to the cellular terminal information in a form of a quiz or a game, said information being selected such that when it is determined that the cellular terminal is within a specific area, said information corresponds to the specific area, and when it is determined that the cellular terminal is not within said specific area, said information corresponds to that other than the specific area, respectively,
    receiving a response relative to the information from the cellular terminal,
    setting a score at the server such that an answer to the information of the specific area is higher than an answer to the information other than the specific area,
    calculating the score of the response, and
    sending information including the score to the cellular terminal,
    wherein selecting area specific information is based on priority order of the information, checking whether the information was given to the user in the past or not to provide information not having been given to the user previously; and
    wherein said information to be delivered includes an advice to an incorrect answer, said advice being obtained by the steps comprising: detecting a category of most frequently selected information, calculating a percentage of the category in the information, and selecting a determination message without considering the category if the percentage is below a predetermined value, and a determination message using a key word if the percentage is above the predetermined value.

2. An information delivery server to be connected to a server for managing a cellular terminal and capable of acquiring positional information for said cellular terminal via a network, said information delivery server comprising:
    a nation-wide local information database containing nation-wide local information,
    an area-specific local information database containing information at a specific area,
    a quiz or game information database containing information in a form of a quiz or game,
    a positional information database for obtaining positional information of the cellular terminal,
    a point information database setting a score such that an answer to the information at the specific area is higher than an answer to the information other than the specific area, and an answer accumulating section containing a query table including a question column, answer column, answer point column, and a position setting column, wherein selecting area specific information is based on priority order of the information, checking whether the information was given to the user in the past or not to provide information not having been given to the user previously; and wherein said information to be delivered includes an advice to an incorrect answer, said advice being obtained by the steps comprising: detecting a category of most frequently selected information, calculating a percentage of the category in the information, and selecting a determination message without considering the category if the percentage is below a predetermined value, and a determination message using a key word if the percentage is above the predetermined value.

3. An information delivery method comprising:

detecting from an information request signal transmitted from a cellular terminal, positional information included in the signal, delivering from a server to the cellular terminal information in a form of a quiz or a game, said information being selected such that when it is determined that the cellular terminal is within a specific area, said information corresponds to the specific area, and when it is determined that the cellular terminal is not within said specific area, said information corresponds to that other than the specific area, respectively, receiving a response relative to the information from the cellular terminal, setting a score at the server such that an answer to the information of the specific area is higher than an answer to the information other than the specific area, calculating the score of the response, and sending information including the score to the cellular terminal, wherein said delivering information and receiving response are repeated for different information, and then, the score is calculated;

wherein selecting area specific information is based on priority order of the information, checking whether the information was given to the user in the past or not to provide information not having been given to the user previously; and wherein said information to be delivered includes an advice to an incorrect answer, said advice being obtained by the steps comprising: detecting a category of most frequently selected information, calculating a percentage of the category in the information, and selecting a determination message without considering the category if the percentage is below a predetermined value, and a determination message using a key word if the percentage is above the predetermined value.

4. The information delivery method according to claim 3, wherein said server includes a plurality of information separated into areas, each information being prepared in a form of question.

5. The information delivery method according to claim 4, wherein said server checks before delivering one information if the one information was delivered to the cellular terminal being used, and delivers the one information if the one information was not delivered.

6. The information delivery method according to claim 5, further comprising, upon receiving the response, checking if the response is correct or not, and if the response is not correct, sending a message whether the information is repeated or skips.

7. The information delivery method according to claim 1, wherein the key word is obtained by detecting questions with high priorities in the category, determining if answers to the questions are correct, and providing the key word of the questions if the answers are not correct.

8. The information delivery server according to claim 2, wherein said answer accumulating section further contains a position-specific point column.

* * * * *